United States Patent
Ikram et al.

(10) Patent No.: US 10,481,242 B2
(45) Date of Patent: Nov. 19, 2019

(54) METHOD FOR JOINT ANTENNA-ARRAY CALIBRATION AND DIRECTION OF ARRIVAL ESTIMATION FOR AUTOMOTIVE APPLICATIONS

(71) Applicant: Texas Instruments Incorporated, Dallas, TX (US)

(72) Inventors: Muhammad Zubair Ikram, Richardson, TX (US); Murtaza Ali, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 647 days.

(21) Appl. No.: 15/145,091

(22) Filed: May 3, 2016

(65) Prior Publication Data
US 2017/0090016 A1    Mar. 30, 2017

Related U.S. Application Data

(60) Provisional application No. 62/233,055, filed on Sep. 25, 2015.

(51) Int. Cl.
*G01S 7/40* (2006.01)
*G01S 19/23* (2010.01)
*G01S 3/02* (2006.01)

(52) U.S. Cl.
CPC ............ *G01S 7/4004* (2013.01); *G01S 3/023* (2013.01); *G01S 19/235* (2013.01)

(58) Field of Classification Search
None
See application file for complete search history.

(56) References Cited

U.S. PATENT DOCUMENTS

| | | | |
|---|---|---|---|
| 9,559,417 B1* | 1/2017 | Schwarzwalder ... | H04B 7/0456 |
| 2008/0266177 A1* | 10/2008 | Chevalier ................ | G01S 3/48 342/417 |
| 2012/0112954 A1* | 5/2012 | Kurono .................... | G01S 3/74 342/147 |
| 2015/0326298 A1* | 11/2015 | Sadr ....................... | G06K 7/0008 340/10.1 |
| 2016/0103207 A1* | 4/2016 | Shirakawa ............... | G01S 3/74 702/151 |
| 2018/0011180 A1* | 1/2018 | Warnick .................. | H01Q 3/34 |

* cited by examiner

*Primary Examiner* — Vladimir Magloire
*Assistant Examiner* — Donald H B Braswell
(74) *Attorney, Agent, or Firm* — Kenneth Liu; Charles A. Brill; Frank D. Cimino

(57) ABSTRACT

This invention is present an iterative method for joint antenna array calibration and direction of arrival estimation using millimeter-wave (mm-Wave) radar. The calibration compensates for array coupling, phase, and gain errors and does not require any training data. This method is well suited for applications where multiple antenna elements are packaged in a chip and where offline calibration is either expensive or is not possible. This invention is also effective when the array coupling is a function of direction of arriving waves from the object. It is also applicable to any two-dimensional array shape. Real experiment results demonstrate the viability of the algorithm using real data collected from a four-element array.

19 Claims, 1 Drawing Sheet

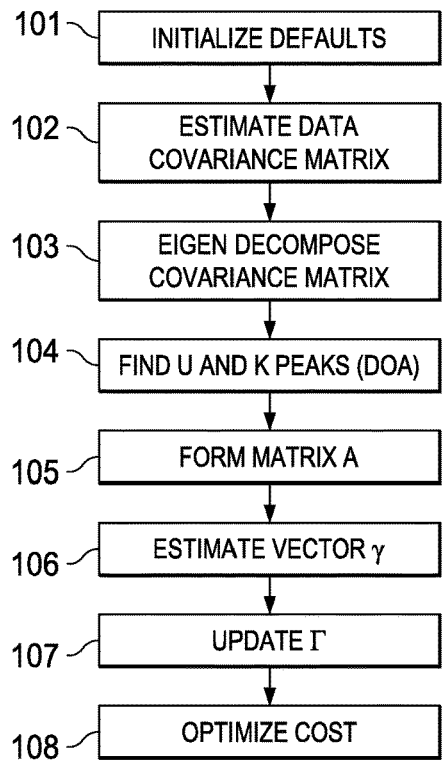
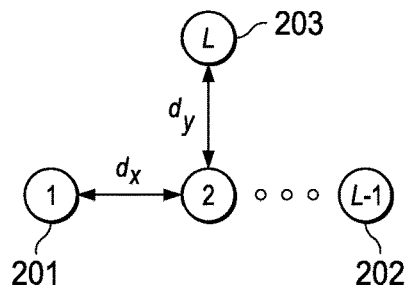
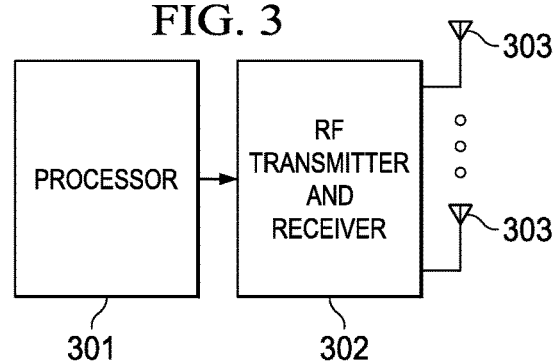
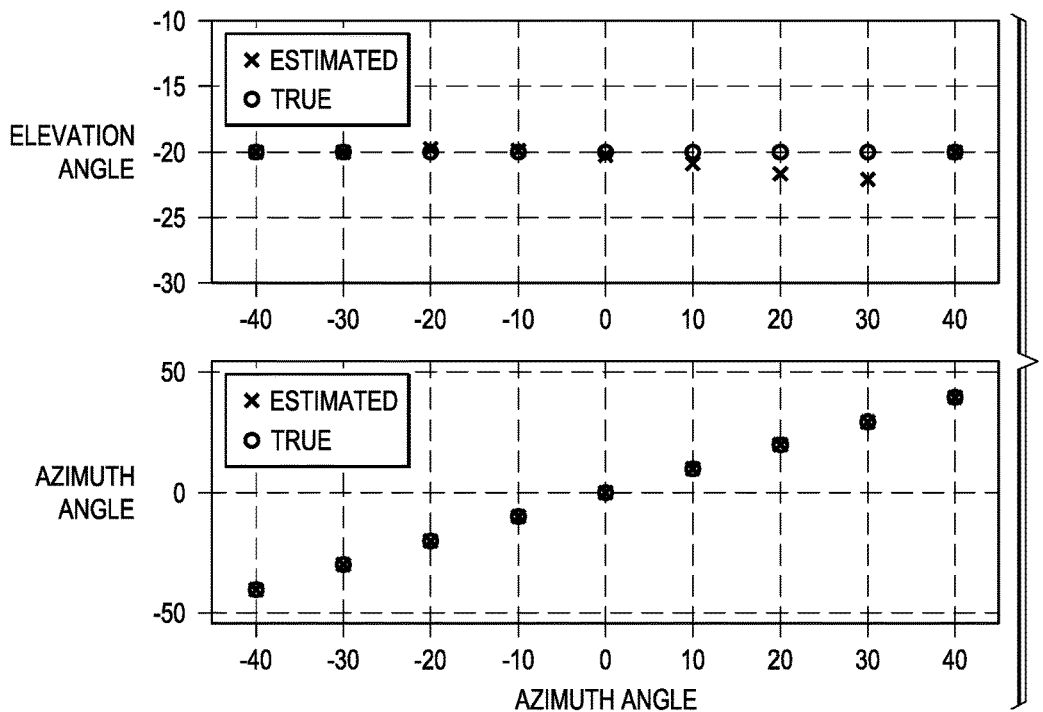

METHOD FOR JOINT ANTENNA-ARRAY CALIBRATION AND DIRECTION OF ARRIVAL ESTIMATION FOR AUTOMOTIVE APPLICATIONS

CLAIM OF PRIORITY

This application claims priority under 35 U.S.C 119(e)(1) to U.S. Provisional Application No. 62/233,055 filed Sep. 25, 2015.

TECHNICAL FIELD OF THE INVENTION

The technical field of this invention is antenna array calibration.

BACKGROUND OF THE INVENTION

This invention estimates the coupling between radar antenna array elements as well as phase and gain of each element. At the same time, the invention estimates the direction of arrival of objects in the radar's field of view. The invention does not require any use of training data for antenna array calibration, and it is applicable to any array shape.

SUMMARY OF THE INVENTION

An iterative method is shown for joint antenna array calibration and direction of arrival estimation on a millimeter wave radar. The calibration compensates for array coupling, phase and gain errors without the requirement for training data. The method shown is also effective when the array coupling is a function of the direction of the arriving waves, and is applicable to two dimensional array shapes.

BRIEF DESCRIPTION OF THE DRAWINGS

These and other aspects of this invention are illustrated in the drawings, in which:

FIG. 1 shows a block diagram of the invention;

FIG. 2 illustrates an exemplary L-element antenna array;

FIG. 3 is a block diagram of one example implementation; and

FIG. 4 illustrates the estimated and true elevation and azimuth angles in degrees versus azimuth.

DETAILED DESCRIPTION OF PREFERRED EMBODIMENTS

Recent years have witnessed widespread use of millimeter-wave (mm-Wave) radars for advanced driver assistance system (ADAS) applications. Compared with other sensing modalities such as a camera, radar has the ability to perform equally well during different times of the day and can be deployed out of sight behind the car bumper or the doors. In many ADAS applications such as parking, cruise control, and braking, the radar is primarily used to find the three-dimensional location of objects around the vehicle. This includes range, azimuth angle, and elevation angle. The range is computed from the round trip delay of the transmitted signal and the two-dimensional (2D) angle is estimated by using the data collected by an antenna array employing a beamforming-based or an eigen-decomposition-based high-resolution frequency estimation method. It is well known that these directions of arrival (DOA) estimates are highly biased if the coupling between antenna array elements is not corrected and compensated for. Additionally, the phase and gain mismatch among antenna elements also adversely affects the estimation. The impact of these non-idealities is pronounced when the antennas are placed very close to each other, which generally is the case in automotive radars.

Calibration for antenna coupling has been widely studied in the past and many methods have been proposed. Generally, training data is collected by an L-element antenna array from the radar field of view and a L×L calibration matrix is estimated; this matrix is then applied to signal received by the array. While this methodology works well for many cases, it is not very well suited for automotive radar applications for the following reasons. First, the antenna coupling for a 2D array changes with DOA from objects. It is, therefore, not possible to estimate a calibration matrix that would be applicable for all directions in the radar field of view. Secondly, in automotive radars where multiple radars are placed on the car and are thus produced in high volume, it is desired that the calibration is done online without any need for training data.

This invention is a joint array calibration and 2D angle estimation method of multiple objects around the vehicle. The method does not require any training data and needs minimal supervision. Whereas in the past, the joint estimation problem was solved for specific array shapes, the problem formulation and optimization proposed in this application can be applied to any array design and shape. We will present experimental results using data collected from a 77 GHz radar with a four-element antenna array to show efficacy of the proposed method. A simplified block diagram of such an implementation is shown in FIG. 3, where 301 is a processor, 302 is the radio frequency front end, and 303 is the antenna array.

Though the analysis below applies to any 2D array shape. we consider a rectangular, L-element antenna array shown in FIG. 2, where L−1 elements 201 through 202 are in one direction, and the L$^{th}$ element 203 is in the orthogonal direction. The array response at time n is given by $$x(n)=B\Gamma As(n), \quad (1)$$

where $x(n)=[x1(n), x2(n), \ldots, xL(n)]^T$, B is a L×L coupling matrix, $\Gamma=\{\alpha_1 e^{-j\omega\psi_1}, \alpha_1 e^{-j\omega\psi_2}, \ldots, \alpha_1 e^{-j\omega\psi_L}, \}$ is L×L matrix with antenna gains and phase values as diagonal elements. $A=[a(\theta_1, \phi_1), a(\theta_2, \phi_2), \ldots, a(\theta_K, \phi_K)]$ is a L×K matrix of steering vectors with $a(\theta_l, \phi_l)$ given by $$\left[1, e^{-j\frac{2\pi}{\lambda}d_x\sin(\theta_l)\cos(\phi_l)}, e^{-j\frac{2(L-1)\pi}{\lambda}d_x\sin(\theta_l)\cos(\phi_l)}, \ldots \atop e^{-j(\frac{2\pi}{\lambda}d_x\sin(\theta_l)\cos(\phi_l)+\frac{2\pi}{\lambda}d_y\sin(\phi_l))}\right]^T,$$

$s(n)=[s_1(n), s_2(n), \ldots, s_K(n)]^T$ is complex signal amplitude, K is the number of objects, $\theta$ is azimuth direction of arrival, $\phi$ is elevation direction of arrival, and $(\bullet)^T$ denotes conjugate transpose. The parameters $\alpha_l$ and $\psi_l$ are gain and delay associated with lth sensor. Biased DOA estimates are obtained if the effects of B and $\Gamma$ are not compensated for in the received signal.

Let $\lambda_i$ and $u_i$, i=1, 2, . . . , L be the eigenvalues and eigenvectors of the sample covariance matrix $R_x=E\{xx^H\}$. Collecting the set of eigenvectors belonging to noise subspace in matrix $U=[u_{K+1}, u_{K+2}, \ldots, u_L]$, the unknowns $\Gamma$, B, $\theta$, and $\phi$ are obtained by minimizing the cost function:

$$J = \sum_{k=1}^{K} \|U^H B \Gamma a(\theta_k, \phi_k)\|^2, \quad (2)$$

where $\|\cdot\|$ denotes Frobenius norm.

In the proposed method, the matrices $\Gamma$ and B, and the angles ($\theta$, $\phi$) are estimated using the following iterative method as shown in FIG. 1:

1) Initialization (101); i=0; Set $B^i$ and $\Gamma^i$ to initial values.
2) Estimate data covariance matrix (102)

$$\hat{R}_x = \frac{1}{N} \sum_{n=1}^{N} x(n)x(n)^H \quad (3)$$

3) Eigen-decompose $\hat{R}_x$ (103), find U and search for K peaks (104) in the 2D spectrum defined by $$P^i(\theta, \phi) = \|U^H B^i \Gamma^i a(\theta, \phi)\|^{-2} \quad (4)$$

The peaks of equation (4) correspond to the DOA estimates $\{(\theta_k, \phi_k)\}_{k=1}^{K}$.

4) Use the estimated DOA to form the matrix A. (105)
5) Under the constraint $\gamma^H w = 1$, where $w = [1, 0, 0, \ldots, 0]^T$, estimate L×1 vector $\gamma$ (106) using the following equation:

$$\gamma = Z^{-1} w / (w^T Z^{-1} w), \quad (5)$$

where the matrix Z is given by $$Z = \sum_{k=1}^{K} Q_k^H B^{iH} U U^H B^i Q_k \quad (6)$$

and the diagonal matrix $Q_k$ is formed using $Q_k = \text{diag}\{a(\theta_k, \phi_k)\}$.

6) Update the estimate of $\Gamma$ (107) using the diagonal elements of $\gamma$ as $\Gamma^{i+1} = \text{diag}\{\gamma\}$.
7) Finally, the cost function in equation (2) is minimized (108) in the least squares sense to solve for B under the constraint $B_{11} = 1$. This optimization is carried out as follows:

Compute KL×L² matrix $M = (A^T B^{iT}) \otimes U^T$, where $\otimes$ defines the Kronecker product.
Extract $M_1 = M(:, 1)$ and $M_2 = M(:, 2:\text{end})$; i.e, $M_1$ contains only the first column of M and $M_2$ is M, except for its first column.
Compute $(L^2-1) \times 1$ vector $b = -M_2^\# M_1$, where $(\bullet)^\#$ denotes pseudo-inverse.
Compute $L^2 \times 1$ vector $\tilde{b} = [1 \ b^T]^T$.
Re-arrange $\tilde{b}$ in rows of L to form updated $B^{i+1}$.

The iterative calibration and angle estimation is continued until the cost function at (i+1)th iteration is smaller than what it was at the ith iteration by a pre-set threshold.

FIG. 4 illustrates the case using a four-element array (L=4) with three elements in one direction and the fourth element in orthogonal direction with a carrier frequency of 77 GHz. The inter-element spacing in either direction was 2 mm. An object was placed at an elevation angle of −20 degrees and moved along the azimuth direction from −40 degrees to 40 degrees in increments of 5 degrees. The matrices B and $\Gamma$ were initialized with identity matrices. At each location of the object, the joint iterative algorithm was used to estimate the DOA's. It took a maximum of 5 iterations for the algorithm to converge to an estimate. FIG. 4 illustrates the azimuth and elevation angles plotted against the azimuth angles.

A joint calibration and angle estimation algorithm is presented. The method is especially suited for automotive applications where multiple sensors are installed around the vehicle and online calibration and angle estimation is highly desired. The method does not impose any constraint on the array shape and structure and takes only a few iterations to converge.

What is claimed is:

1. A method comprising:
   determining, for a radar system having an antenna array with L antenna elements, an initial array response to K objects within a field of view of the radar system, wherein L is an integer ≥1, K is an integer ≥2, and the initial array response is a function of a first matrix that is an initial coupling matrix, a second matrix that includes for each of the L antenna elements an initial value based on a gain value and a phase value of the antenna element, a third matrix that includes an initial direction of arrival (DOA) estimate for each of the K objects, and a fourth matrix that includes a complex signal amplitude value for each of the K objects;
   determining a covariance matrix based on the initial array response;
   performing eigen-decomposition of the covariance matrix to determine an updated DOA estimate for each of the K objects;
   updating the third matrix based at least partially on the updated DOA estimates;
   updating the second matrix based at least partially on a fifth matrix that is a diagonal matrix based on the updated DOA estimates and a sixth matrix that includes eigenvectors corresponding to the covariance matrix;
   updating the first matrix in accordance with a cost function that is a function of the updated second matrix, the updated third matrix, and the sixth matrix; and
   using the updated first matrix and the updated second matrix when processing signals received by the antenna array to determine additional direction of arrival (DOA) estimates for each of the K objects.

2. The method of claim 1, wherein the second matrix is a diagonal matrix and wherein the initial values based on the gain value and the phase value of each of the L antenna elements are arranged as diagonal elements of the second matrix.

3. The method of claim 1, wherein:
   the first matrix has dimensions L×L;
   the second matrix has dimensions L×L;
   the third matrix has dimensions L×K; and
   the fourth matrix is a column vector having K elements.

4. The method of claim 1, wherein the initial coupling matrix is an identity matrix.

5. The method of claim 1, wherein the updated DOA estimate for each of the K objects includes a first component that is an azimuth direction of arrival for the object and a second component that is an elevation direction of arrival for the object.

6. The method of claim 1, wherein each updated DOA estimate includes:
   an azimuth direction of arrival for a respective one of the K objects;
   an elevation direction of arrival for the respective one of the K objects; and
   an eigenvalue of the covariance matrix.

7. The method of claim 1, wherein using the updated first matrix and the updated second matrix when processing signals received by the antenna array to determine additional direction of arrival (DOA) estimates for each of the K objects results in reduced biasing error in the additional direction of arrival (DOA) estimates.

8. The method of claim 1, wherein the L antenna elements of the antenna array are arranged in a two-dimensional arrangement with at least two of the L antenna elements being arranged in a first direction and at least one other of the L antenna elements being arranged in a manner that is orthogonal to the first direction.

9. The method of claim 1, wherein the radar system is a millimeter-wave radar system.

10. A system comprising:
   an antenna array including L antenna elements, wherein L is an integer ≥1;
   radio frequency (RF) circuitry coupled to the antenna array; and
   a processor coupled to the RF circuitry and configured to execute instructions to process signals received via the antenna array to:
      determine an initial array response to K objects within a field of view of the antenna array, wherein K is an integer ≥2, and wherein the initial array response is a function of a first matrix that is an initial coupling matrix, a second matrix that includes for each of the L antenna elements an initial value based on a gain value and a phase value of the antenna element, a third matrix that includes an initial direction of arrival (DOA) estimate for each of the K objects, and a fourth matrix that includes a complex signal amplitude value for each of the K objects;
      determine a covariance matrix based on the initial array response;
      perform eigen-decomposition of the covariance matrix to determine an updated DOA estimate for each of the K objects;
      update the third matrix based at least partially on the updated DOA estimates;
      update the second matrix based at least partially on a fifth matrix that is a diagonal matrix based on the updated DOA estimates and a sixth matrix that includes eigenvectors corresponding to the covariance matrix;
      update the first matrix in accordance with a cost function that is a function of the updated second matrix, the updated third matrix, and the sixth matrix; and
      use the updated first matrix and the updated second matrix when processing additional signals received by the antenna array to determine additional direction of arrival (DOA) estimates for each of the K objects.

11. The system of claim 10, wherein the second matrix is a diagonal matrix and wherein the initial values based on the gain value and the phase value of each of the L antenna elements are arranged as diagonal elements of the second matrix.

12. The system of claim 10, wherein:
   the first matrix has dimensions L×L;
   the second matrix has dimensions L×L;
   the third matrix has dimensions L×K; and
   the fourth matrix is a column vector having K elements.

13. The system of claim 10, wherein the initial coupling matrix is an identity matrix.

14. The system of claim 10, wherein each updated DOA estimate includes:
   an azimuth direction of arrival for a respective one of the K objects;
   an elevation direction of arrival for the respective one of the K objects; and
   an eigenvalue of the covariance matrix.

15. The system of claim 10, wherein using the updated first matrix and the updated second matrix when processing signals received by the antenna array to determine additional direction of arrival (DOA) estimates for each of the K objects results in reduced biasing error in the additional direction of arrival (DOA) estimates.

16. The system of claim 10, wherein the L antenna elements of the antenna array are arranged in a two-dimensional arrangement with at least two of the L antenna elements being arranged in a first direction and at least one other of the L antenna elements being arranged in a manner that is orthogonal to the first direction.

17. The system of claim 10, wherein the antenna array is part of a millimeter-wave radar system.

18. The system of claim 10, wherein the system is an advanced driver assistance system (ADAS).

19. An integrated circuit comprising:
   a memory to store instructions;
   a processor coupled to the memory and configured to execute the instructions to:
      determine an initial array response to K objects within a field of view of the radar system having an antenna array with L antenna elements, wherein L is an integer greater than or equal to 1 and wherein K is an integer greater than or equal to 2, and wherein the initial array response is a function of a first matrix that is an initial coupling matrix, a second matrix that includes for each of the L antenna elements an initial value based on a gain value and a phase value of the antenna element, a third matrix that includes an initial direction of arrival (DOA) estimate for each of the K objects, and a fourth matrix that includes a complex signal amplitude value for each of the K objects;
      determine a covariance matrix based on the initial array response;
      perform eigen-decomposition of the covariance matrix to determine an updated DOA estimate for each of the K objects;
      update the third matrix based at least partially on the updated DOA estimates;
      update the second matrix based at least partially on a fifth matrix that is a diagonal matrix based on the updated DOA estimates and a sixth matrix that includes eigenvectors corresponding to the covariance matrix;
      update the first matrix in accordance with a cost function that is a function of the updated second matrix, the updated third matrix, and the sixth matrix; and
      use the updated first matrix and the updated second matrix when processing additional signals received by the antenna array to determine additional direction of arrival (DOA) estimates for each of the K objects.

* * * * *